US011514764B2

(12) United States Patent
Correnti et al.

(10) Patent No.: US 11,514,764 B2
(45) Date of Patent: Nov. 29, 2022

(54) SMARTLOCK SYSTEM FOR IMPROVED FIRE SAFETY

(71) Applicant: Alarm.com Incorporated, Tysons, VA (US)

(72) Inventors: Matthew Daniel Correnti, Newtown Square, PA (US); Eric Liao, Tysons, VA (US); Johnathan Michael Carone, Tysons, VA (US); Alexander Prugh, Tysons, VA (US); Alice Kuprenas, Tysons, VA (US); Fabian Emilio Philipe Camargo, Falls Church, VA (US); Isaac Murakami, Tysons, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 17/101,728

(22) Filed: Nov. 23, 2020

(65) Prior Publication Data
US 2021/0158664 A1 May 27, 2021

Related U.S. Application Data

(60) Provisional application No. 62/938,569, filed on Nov. 21, 2019.

(51) Int. Cl.
*G08B 7/06* (2006.01)
*G08B 25/10* (2006.01)
(Continued)

(52) U.S. Cl.
CPC .............. *G08B 7/066* (2013.01); *E05B 41/00* (2013.01); *G01C 21/206* (2013.01); *G01K 1/024* (2013.01);
(Continued)

(58) Field of Classification Search
CPC ...... E05B 1/003; E05B 17/0075; E05B 41/00; E05B 47/0002; E05B 2047/0067;
(Continued)

(56) References Cited

U.S. PATENT DOCUMENTS 4,540,980 A * 9/1985 Porco .................... G08B 13/00
340/546
5,718,513 A * 2/1998 Booth ...................... G01K 1/16
116/207
(Continued)

FOREIGN PATENT DOCUMENTS

| AU | 2008200701 | 2/2008 |
| KR | 20160023506 | 10/2016 |
| WO | WO2007128095 | 11/2007 |

*Primary Examiner* — Stephen R Burgdorf
(74) *Attorney, Agent, or Firm* — Fish & Richardson P.C.

(57) ABSTRACT

Methods, systems, and apparatus, including computer programs encoded on computer storage mediums, for a smartlock device that can be integrated in a door at a property. The smartlock device includes a locking mechanism configured to lock the door and to unlock the door. The device includes a radio device and a sensor that determines a first temperature of the smartlock device and a second temperature of a room that is accessible via the door. The radio device is operable to: i) receive parameter signals from the sensor indicating each of the first and second temperatures; ii) transmit data that includes the first and second temperatures to a monitoring system; and iii) receive a command to cause the locking mechanism to unlock the door based on information from the monitoring system. The information includes a determined routing of occupants at the property and is presented on a display of the device.

18 Claims, 5 Drawing Sheets

(51) Int. Cl.
*G01K 1/024* (2021.01)
*G01K 1/02* (2021.01)
*G01C 21/20* (2006.01)
*E05B 41/00* (2006.01)
*G08B 17/06* (2006.01)
*E05B 47/00* (2006.01)
*G07C 9/00* (2020.01)
*G07C 9/38* (2020.01)
*G06Q 50/26* (2012.01)
*G06Q 50/16* (2012.01)

(52) U.S. Cl.
CPC .......... *G01K 1/026* (2013.01); *G06Q 50/163* (2013.01); *G06Q 50/265* (2013.01); *G07C 9/00571* (2013.01); *G07C 9/00904* (2013.01); *G07C 9/38* (2020.01); *G08B 17/06* (2013.01); *G08B 25/10* (2013.01); *E05B 47/0002* (2013.01); *E05B 2047/0067* (2013.01); *E05B 2047/0073* (2013.01); *E05Y 2400/44* (2013.01); *E05Y 2400/52* (2013.01); *E05Y 2400/818* (2013.01); *E05Y 2900/132* (2013.01)

(58) Field of Classification Search
CPC ......... E05B 2047/0073; E05Y 2400/44; E05Y 2400/52; E05Y 2400/818; E05Y 2900/132; F41A 17/063; G01C 21/206; G01C 21/3461; G01K 1/024; G01K 3/005; G01N 33/0031; G01S 5/0284; G05B 15/02; G05B 17/02; G05D 1/02; G05D 1/102; G06F 16/951; G06Q 50/163; G06Q 50/265; G07C 9/00571; G07C 9/00904; G07C 9/38; G08B 7/066; G08B 17/06; G08B 25/10; G08B 29/02; H04L 12/2818; H04L 67/12; H04N 7/181; H04N 7/186; H04W 4/80
See application file for complete search history.

(56) References Cited

U.S. PATENT DOCUMENTS

| | | | |
|---|---|---|---|
| 5,950,150 | A | 7/1999 | Lloyd et al. |
| 6,133,839 | A * | 10/2000 | Ellul, Jr. ................ G08B 7/062 340/331 |
| 7,484,668 | B1 | 2/2009 | Eiler |
| 8,164,440 | B2 | 4/2012 | Lontka |
| 8,786,435 | B2 | 7/2014 | Barnett et al. |
| 9,818,243 | B2 | 11/2017 | Fitzgibbon |
| 10,062,233 | B1 * | 8/2018 | Rogers ................ G08B 27/001 |
| 10,769,902 | B1 * | 9/2020 | Kronz .................... H04W 4/38 |
| 2011/0267179 | A1 * | 11/2011 | Patterson ............... G08B 7/066 340/286.02 |
| 2012/0047083 | A1 * | 2/2012 | Qiao ...................... G08B 21/02 705/325 |
| 2016/0123741 | A1 * | 5/2016 | Mountain ................ H04N 5/44 701/533 |
| 2017/0123391 | A1 * | 5/2017 | Sinha ..................... G05B 15/02 |
| 2018/0135336 | A1 * | 5/2018 | Johnson ................ H04N 7/186 |
| 2018/0365942 | A1 * | 12/2018 | Molloy ................... H04W 4/90 |
| 2021/0126976 | A1 * | 4/2021 | Chang ................ G07C 9/00571 |
| 2021/0142630 | A1 * | 5/2021 | Carballido Villaverde ................ G08B 17/00 |

* cited by examiner

400

```
┌─────────────────────────────────────────────────────────────────┐
│  RECEIVE SENSOR DATA GENERATED BY A SMART LOCK DEVICE AT A PROPERTY │
│                                                             410 │
└─────────────────────────────────────────────────────────────────┘
                                │
                                ▼
┌─────────────────────────────────────────────────────────────────┐
│  DETERMINE THAT TEMPERATURES OF THE SENSOR DATA ARE INDICATIVE OF A │
│                      FIRE AT THE PROPERTY                       │
│                                                             420 │
└─────────────────────────────────────────────────────────────────┘
                                │
                                ▼
┌─────────────────────────────────────────────────────────────────┐
│  DETERMINE A ROUTING OF OCCUPANTS AT THE PROPERTY BASED ON THE  │
│                         SENSOR DATA                             │
│                                                             430 │
└─────────────────────────────────────────────────────────────────┘
                                │
                                ▼
┌─────────────────────────────────────────────────────────────────┐
│  GENERATE A STATUS INDICATION THAT INCLUDES THE DETERMINED ROUTING │
│         FOR OUTPUT ON A DISPLAY OF THE SMARTLOCK DEVICE         │
│                                                             440 │
└─────────────────────────────────────────────────────────────────┘
                                │
                                ▼
┌─────────────────────────────────────────────────────────────────┐
│  PROVIDE A COMMAND WITH THE STATUS INDICATION TO THE SMARTLOCK DEVICE │
│     TO CAUSE THE DEVICE TO UNLOCK A DOOR AT THE PROPERTY        │
│                                                             450 │
└─────────────────────────────────────────────────────────────────┘
                                │
                                ▼
┌─────────────────────────────────────────────────────────────────┐
│  PRESENT THE STATUS INDICATION ON THE DISPLAY OF THE SMARTLOCK DEVICE │
│                                                             460 │
└─────────────────────────────────────────────────────────────────┘
```

Fig. 4

SMARTLOCK SYSTEM FOR IMPROVED FIRE SAFETY

CROSS REFERENCE TO RELATED APPLICATION

This application claims the benefit of U.S. Provisional Application No. 62/938,569, filed on Nov. 21, 2019, which is incorporated herein by reference in its entirety.

FIELD

This specification relates to devices for improving fire safety at a property.

BACKGROUND

Monitoring devices and sensors are often dispersed at various locations at a property, such as a home or commercial business. These devices and sensors can have distinct functions at different locations of the property. Some sensors at a property offer different types of monitoring and control functionality. The functionality afforded by these sensors and devices can be leveraged to secure items at a property, to obtain information about respective items at multiple different properties, and to control certain safety devices that may be located at the properties.

SUMMARY

This document describes techniques for implementing a smartlock device that provides a modern solution for detecting an occurrence of a safety related incident (e.g., a fire) at a property, automatically providing access to particular routes and areas of a property in response to detecting the incident, and for directing or routing occupants to exit the property along particular routes that avoid the location of the incident. The smartlock device can provide access to particular routes and areas of a property by automatically locking or unlocking a door at the property to permit an occupant to enter, exit, or pass through a room or area of the property.

One aspect of the subject matter described in this specification can be embodied in a smartlock device for integrating in a door at a property. The smartlock device includes: a locking mechanism configured to lock the door and to unlock the door; a sensor that is operable to determine a first temperature of the smartlock device or a second temperature of a room that is accessible via the door; and a radio device that has an electrical connection to each of the locking mechanism and the sensor. The radio device is operable to: i) receive parameter signals from the sensor indicating each of the first and second temperatures, ii) transmit, to a monitoring system of the property, data that includes each of the first and second temperatures, and iii) receive a command to cause the locking mechanism to unlock the door based on information from the monitoring system that includes a determined routing of occupants at the property.

These and other implementations can each optionally include one or more of the following features. For example, in some implementations, the smartlock device includes a display that is operable to output status indications about each of (a) the smartlock device and (b) the property, based on the sensor and the radio device, wherein one or more of the status indications comprises: i) a first status indication that is based on the sensor and that indicates the first temperature of the smartlock device or the second temperature of the room that is accessible via the door; and ii) a second status indication that is based on the radio device and that indicates a determined routing of occupants at the property.

One aspect of the subject matter described in this specification can be embodied in a method that includes receiving, from a sensor at a property, sensor data about activity at a property, wherein a portion of the sensor data is generated by a smartlock device integrated in a door at the property and determining, based on the sensor data, that at least one of a first temperature of the smartlock device is indicative of a fire at the property or a second temperature of a room that is accessible via the door is indicative of a fire at the property.

The method includes determining a routing of occupants at the property based at least on the first temperature or the second temperature of the sensor data, and information in the sensor data that indicates a location of the fire at the property, and generating, based on the sensor data, a status indication to be output on a display of the smartlock device. The status indication includes the determined routing of the occupants. The method includes providing, to the smartlock device, a command that includes the status indication; causing, by the smartlock device and based on the command, a locking mechanism of the smartlock to unlock the door to permit an occupant at the property to open the door; and presenting, on the display of the smartlock device, the status indication that includes the determined routing of the occupants based on the command.

These and other implementations can each optionally include one or more of the following features. For example, in some implementations, the property includes a plurality of doors and each door of the plurality of doors includes a respective smartlock device integrated in the door, and the method comprises: providing, to each smartlock device, the command that includes the status indication; and presenting, on a respective display of each smartlock device, a portion of the determined routing of the occupants based on the command.

In some implementations, the method includes generating a safety alert that is configured to be provided to, and received by, one or more first responders or a property manager of the property, wherein the safety alert describes the determined routing of the occupants and a particular exit of the property that is included in the determined routing. In some implementations, the method includes providing the safety alert to a first responder to enable the first responder to receive the occupants as the occupants exit the property using the particular exit, wherein the particular exit is specified in the status indication presented on the display of the smartlock device.

In some implementations, the status indication includes a direction of one or more paths of the determined routing of the occupants; and the direction of the one or more paths directs the occupants to the particular exit of the property along a route that avoids the fire at the property. In some implementations, the direction of the one or more paths directs the occupants to the particular exit of the property along a route that avoids areas of the property that have (i) the first temperature which is indicative of the fire or (ii) the room which has the door and the second temperature that is indicative of the fire.

In some implementations, the method includes generating a particular safety alert that is configured to be provided to, and received by, one or more first responders, and wherein the particular safety alert specifies the direction of the one or more paths of the determined routing of the occupants presented on the display of the smartlock device. In some implementations, the method includes providing the particular safety alert to a particular first responder to enable the particular first responder to locate the occupants along one or more paths that direct the occupants to the particular exit of the property.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

BRIEF DESCRIPTION OF THE DRAWINGS

FIG. 4 shows an example process for routing occupants at a property based on status indications presented on a display of the example smartlock device of FIG. 2.

Like reference numbers and designations in the various drawings indicate like elements.

DETAILED DESCRIPTION

A property, such as a house or a place of business, can be equipped with a property monitoring system to enhance the security of the property. The property monitoring system may include one or more sensors, such as motion sensors, camera/digital image sensors, temperature sensors, distributed about the property to monitor conditions at the property. In many cases, the monitoring system also includes a control unit and one or more controls which enable automation of various actions at the property. The actions can include determining a temperature of a room or area at the property, setting a thermostat, engaging or disengaging mechanisms that provide access to certain areas at the property or that preclude access to certain areas at the property. The actions can also include triggering actions or commands to arm or disarm a security system at the property.

In this context, techniques are described for a smartlock device and a computing system that generates commands or instructions for activating certain functions of the smartlock device. For example, components and devices of the computing system can be included at the smartlock device to actuate a locking mechanism of the smartlock device based on commands generated by the system. In some implementations, the described techniques can be used to integrate "smart" fire safety locks in an apartment home or commercial building to aid in routing or directing people (e.g., building occupants) to safety during a fire or other emergency incident. The smartlock device may be one of multiple components included in a property monitoring system for securing property and improving the safety of the occupants at the property.

The smartlock device includes a locking mechanism that is operable to lock and unlock a door and at least one sensor that is operable to detect temperatures of certain areas or rooms that may be near the smartlock device. The smartlock device also includes a radio component/device that is configured to communicate, e.g., wirelessly with other sensors, "smart" devices, and components of the property monitoring system. The smartlock device also includes a display for displaying or presenting status indications about a determined routing of occupants at the property.

The status indications can be visual, graphical, or audio outputs that specify one or more paths or directions for a particular route that occupants can use to exit a property during an emergency incident such as a fire. In general, the smartlock device can be implemented to minimize a potential for injury to occupants during an emergency incident. In some implementations, the smartlock device is operable to provide alerts/notifications (e.g., in real-time), transmit "panic" signals to remote monitoring stations, and provide resources and information that can assist emergency responders in locating occupants at the property during an emergency incident.

Figure 1:
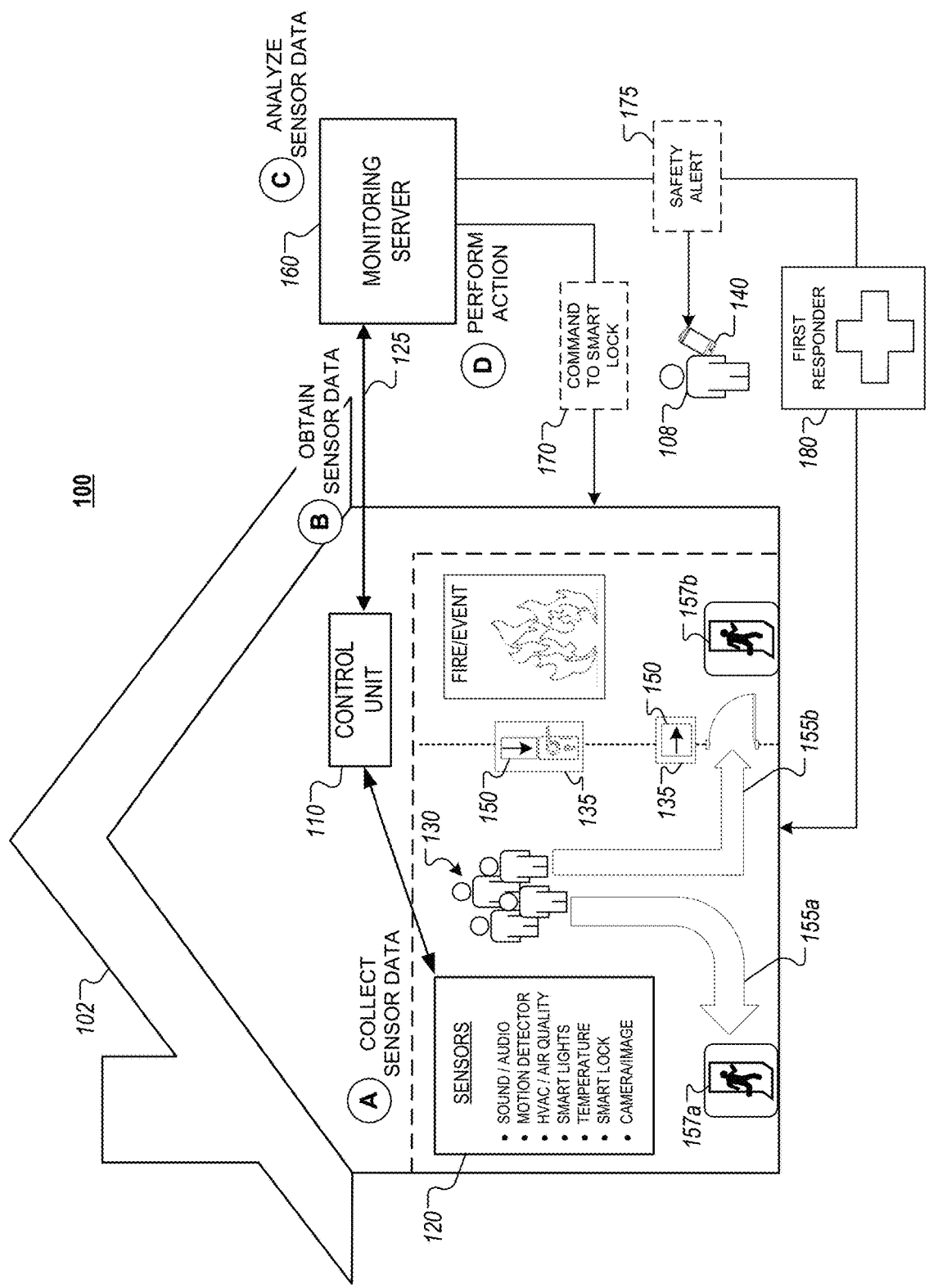
FIG. 1 shows a block diagram of an example property monitoring system that includes an example smartlock device integrated in a door at a property.

FIG. 1 shows a block diagram of an example property monitoring system 100 ("system 100") that can be used to perform one or more actions for securing a property 102 and for improving the safety of one or more occupants at the property 102. The property 102 may be, for example, a residence, such as a single family home, a townhouse, a condominium, or an apartment. In some examples, the property 102 may be a commercial property, a place of business, or a public property, such as a police station, fire department, or military installation.

The system 100 can include multiple sensors 120. Each sensor 120 can be associated with various types of devices that are located at property 102. For example, a sensor can be associated with a video or image recording device located at the property 102, such as a digital camera or other electronic recording device. Similarly, a sensor(s) can be associated with safety or smartlock devices and associated mechanisms used to control the locking and unlocking of a door at the property as well as to present status indications (described below) to occupants at the property 102.

As described above, the property 102 is monitored by a property monitoring system. The property monitoring system includes a control unit 110 that sends sensor data 125, obtained using sensors 120, to a remote monitoring server 160. The system 100 also includes a smartlock device 135 that is operable to generate sensor data 125 that can be processed at the monitoring server 160 to detect whether an emergency incident is occurring at the property 102. In some implementations, control units, monitoring servers, or other computing modules described herein are included as subsystems of the property monitoring system 100.

Each of the smartlock device 135 and monitoring server 160 is operable to detect an occurrence of a safety related incident (e.g., a fire) at a property. In some cases, the monitoring server 160 determines that an emergency incident is occurring at the property 102 based on data communications with at least one sensor of a smartlock device 135. In other cases, the monitoring server 160 determines that an emergency incident is occurring at the property 102 based on data communications with sensors of multiple distinct smartlock devices 135 and multiple sensors 120 that are installed at the property 102.

The smartlock device 135 interacts with the monitoring server 160 to automatically provide access to particular routes and areas of a property in response to detecting the occurrence of an emergency incident. As described in more detail below, the smartlock device 135 is configured to present one or more status indications 150. In some implementations, the smartlock device 135 presents the status indications 150 based on commands generated by the monitoring server 160 that specify a determined routing of occupants at the property. The monitoring server 160 can interact with the smartlock device 135 to determine a routing of occupants at the property.

In some implementations, the smartlock device 135 is operable to determine a routing of occupants at the property based on sensor data 125 generated locally at the smartlock device 135, based on sensor data 125 that is generated by other sensors 120 at the property 102, or both.

As used in this document, a determined routing of occupants at the property 102 corresponds to a set of directions that specify a particular route, path, or direction of travel that can be used by an occupant at the property. For example, a determined routing of occupants at the property can be based on coded software or programmed instructions that represent the set of directions. The determined routing may be presented as status indications such as "use route A, along corridor X," "continue straight [↑]", "turn left [←]," or "exit right [→]."

The status indications 150 include information for directing or routing occupants to exit the property along particular routes 155a and 155b. Each of routes 155a and 155b are example routes that can be determined by the smartlock device 135 or the monitoring server 160 of system 100. In general, the status indications are configured to provide information about one or more paths or directions for a particular route that occupants can use to exit a property during an emergency incident such as a fire.

For example, the status indications include information for directing or routing occupants to exit the property 102 using routes that avoid a location of an emergency incident that was detected by the property monitoring system. The status indications that include the information for the determined routing may be presented as visual or graphical outputs that are displayed at the smartlock device 135. In some implementations, some status indications are presented as audio prompts that are output using a speaker or audio device integrated in the smartlock device 135 or another device at the property 102.

The monitoring server 160 is configured to pull or obtain new sensor data 125 from one or more sensors 120 and smartlock device 135, and to use an example incident safety/routing engine to analyze the new data. An example of an incident safety/routing engine is described below with reference to FIG. 5. In response to analyzing the new data, the monitoring server 160 may detect the occurrence of a fire or other emergency incident at the property. The monitoring server 160 can determine that the detected incident warrants activating or actuating one or more functions of a smartlock device 135 (described below).

Each of the sensors 120 can use various types of technology to transmit sensor signal data or to exchange data communications with devices of system 100 (or the property monitoring system). In some implementations, one or more sensors 120 at the property 102 can be at least one of: a Z-Wave enabled sensing device, a Bluetooth enabled sensing device, a Wi-Fi enabled sensing device, or a sensing device that uses radio or wireless signal technology. Additional sensor features are described in more detail below.

The property monitoring system and the control unit 110 can be located at the property 102 or at a remote location relative to a location of the property 102. In some implementations, the control unit 110 is located at the property 102, while other units and devices that form the property monitoring system are located at a remote location. The sensors 120 generate sensor data 125 describing various types of sensed activity at the property 102.

For example, the sensors 120 can be one or more of a motion sensor, a smoke detector, a carbon monoxide sensor, an air quality sensor, a video/imaging sensor, a temperature sensor, a special-purpose sensor, or various other types of sensors that are operable to sense certain conditions, statuses, or activities at the property 102. In some implementations, at least a subset of the sensors 120 are configured to detect whether a fire is presently occurring at the property 102 such that occupants may need to evacuate a building located at the property 102. For example, at least one sensor may be a temperature sensor that is integrated in the smartlock device 135 and that is operable to detect elevated temperatures that are indicative of a fire at the property 102.

Sensor data 125 can include information about sensed activities such as (i) whether a locking mechanism of a smartlock device 135 was actuated to lock a door or unlock a door at the property 102, (ii) certain types of detected motion involving occupants at the property 102, (iii) whether a window at the property 102 is open, closed, or damaged (e.g., window glass being shattered or broken), or (iv) whether a fire, smoke, or poor air quality is present in a certain location or area of the property 102. Sensor data 125 can also describe sensed activities such as image or video data of an emergency incident at the property 102 (e.g., a fire or active shooter). The sensor data 125 can also provide general information about the property 102, such as a determined location of an incident at the property 102, the arm/disarm status of an alarm/security system at the property 102, or the lock/unlock status of a door at the property 102.

Control unit 110 can be located at the property 102 and may be a computer system or other electronic device configured to communicate with the sensors 120 and the smartlock device 135 to cause various functions to be performed for the property monitoring system 100. The control unit 110 may include a processor, a chipset, a memory system, or other computing hardware. In some cases, the control unit 110 may include application-specific hardware, such as a field-programmable gate array (FPGA), an application-specific integrated circuit (ASIC), or other embedded or dedicated hardware. The control unit 110 may also include software, which configures the unit to perform the functions described in this document.

For example, the control unit 110 can activate a camera, lock or unlock a door/window, activate/arm an alarm system, de-activate/de-arm the alarm system, power on or off a light at the property 102, or actuate a locking mechanism of the smartlock device 135. As described in more detail below, a user 108 can use mobile/client device 140 to interact with the smart home application and provide commands to the sensors 120, via the control unit 110, to perform the various operations described in this document.

In some implementations, the user 108 communicates with the control unit 110 through a network connection, such as a wired or wireless connection. The user 108 can be a property owner, security manager, property manager, or occupant/resident of the property 102. In some implementations, the property owner or user 108 communicates with the control unit 110 through a software application (e.g., "smart home" or "smart business" application) installed on their mobile device 140. The control unit 110 can perform various operations related to the property 102 by sending commands to one or more of the sensors 120 at the property 102.

In some implementations, each of the smartlock device 135 and monitoring server 160 is operable to provide alerts/notifications 175 (e.g., in real-time) to the user 108 as well as to emergency/first responders 180. In some implementations, the monitoring server 160 generates an example safety alert 175 based on sensor data provided by the smartlock device 135. The safety alert 175 can be a push notification that is provided to the user 108 when an emergency incident occurs.

The sensors 120 can receive, via network 105, a wireless (or wired) signal that controls operation of each sensor 120. For example, the signal can cause the sensors 120 to initialize or activate to sense activity at the property 102 and generate sensor data 125. The sensors 120 can receive the signal from monitoring server 160 or from control unit 110 that communicates with monitoring server 160. In addition to detecting and processing wireless signals received via network 105, the sensors 120 can also transmit wireless signals that encode sensor data 125.

The monitoring server 160 receives and analyzes the sensor data 125 encoded in wireless signals transmitted by the sensors 120. For example, the monitoring server 160 analyzes the sensor data 125 encoded in the wireless signals to determine or to obtain information about activities occurring at the property, such as a location of an emergency incident or a location of occupants that may be affected by the incident. In some implementations, monitoring server 160 performs various functions related to analyzing or monitoring video and image data as well as processing sensor parameter values included in the sensor data 125.

As described below, the smartlock device 135 can include electronic and signal processing components for integrating or communicating with components of the property monitoring system 100. For example, the smartlock device 135 is operable to receive commands 170 and other signals for locking or unlocking a door at the property 102. In some implementations, the command 170 is a data payload that includes instructions and data values for commanding the smartlock device 135 or components of the smartlock device 135 to perform one or more functions. The command 170 causes the smartlock device 135 to display status indications 150 that include information for directing or routing occupants to exit the property along particular routes 155a and 155b that lead the occupants to exits 157a, 157b.

FIG. 1 includes stages A through D, which represent a flow of data. In stage (A), each of the one or more sensors 120 generate sensor data 125 including parameter values that describe different types of sensed activity at the property 102. In some implementations, at least one sensor 120 corresponds to a sensor (e.g., a temperature sensor) integrated in the smartlock device 135. The control unit 110 (e.g., located at the property 102) can collect and send the sensor data 125 to the remote monitoring server 160 for processing and analysis at the monitoring server.

In some implementations, the smartlock device 135 interacts with a property monitoring system to provide an additional "sensor" that is operable to detect one or more temperatures or other sensor data 125 that may be indicative of a fire or incident at the property 102. The smartlock device 135 is operable to provide the temperature readings as sensor data 125 to the monitoring server 160 for analysis at the server.

In stage (B), the monitoring server 160 receives or obtains sensor data 125 from the control unit 110. As discussed above, the monitoring server 160 can communicate electronically with the control unit 110 through a wireless network, such as a cellular telephony or data network, through any of various communication protocols (e.g., GSM, LTE, CDMA, 3G, 4G, 5G, 802.11 family, etc.). In some implementations, the monitoring server 160 receives or obtains sensor data 125 directly from the individual sensors rather than from control unit 110.

In stage (C), the monitoring server 160 analyzes the sensor signal data 125 and/or other property data received from the control unit 110 or directly from sensors/devices 120 located at the property 102. As indicated above, the monitoring server 160 analyzes the sensor data 125 to detect that, or determine whether, an emergency incident is occurring at the property 102. The monitoring server 160 may detect the occurrence of a fire or other emergency incident at the property. The monitoring server 160 can determine that the detected incident warrants activating or actuating one or more functions of a smartlock device 135. The monitoring server 160 can interact with the smartlock device 135 to determine a routing of occupants at the property.

Based on the data analysis, in stage (D), the monitoring server 160 performs various actions. For example, the monitoring server 160 sends commands 170 to the smartlock device 135 to cause the smartlock device 135 to lock or unlock a door at the property 102 in response to parameter values of the sensor data 125 that indicate an emergency incident is occurring at the property 102. The command 170 can include instructions for generating one or more status indications. The command 170 causes the smartlock device 135 to present the status indications on a display of the smartlock device 135 to direct or route the occupants 130 to one of exits 157a or 157b.

An example smartlock device 135 may be installed at, or integrated in, a garage door of the property 102 or an entry/exit gate of the property 102. In some cases, the monitoring server 160 determines that a safest path or route out of a building includes exiting property 102 through a garage door or entry/exit gate of the property 102. In response to making this determination, the monitoring server 160 is operable to automatically open the garage door or gate, to ensure occupants do not have to wait for the garage door/gate to open (or fully open) when the occupants arrive at the garage door. In some cases, the monitoring server 160 is operable to close (e.g., automatically close) a garage door, including various other doors, at the property 102 to prevent or mitigate a fire from spreading as well as to prevent occupants from going into a garage area when a fire or other emergency incident is occurring in the garage.

In response to the system 100 determining that the smartlock device 135 has unlocked a door along a determined evacuation route, the monitoring server 160 can transmit one or more commands 175 to activate an alarm system at the property 102 and to alert emergency personnel 180. In general, the monitoring server 160 can use results of analysis performed at the safety engine 170 to trigger one or more actions relating to the security of a user 108 or actions that may aid in the safe exit of occupants at the property 102.

In some implementations, the user/registered owner 108 uses client device 140 to communicate with the monitoring server 160 to obtain or receive safety alerts 175. The safety alerts 175 are generated by the smartlock device 135 or the monitoring server 160 based on the sensor data 125. In some implementations, the owner 108 uses the client device 140 to communicate with the monitoring server 160 to transmit a command 170 to cause the smartlock device 135 unlock or lock a door. In some cases, the command 170 establishes a communication channel between one or more smartlock devices 135 and a mobile device 140 of the user 108. The communication channel is configured to allow the user to communicate with occupants at the property 102 as the occupants move along a path of a determined evacuation route.

Though the stages are described above in order of (A) through (D), it is to be understood that other sequencings are possible and disclosed by the present description. For example, in some implementations, the monitoring server 160 may receive sensor data 125 from the control unit 110 that includes both sensor status information and usage data 126 for each sensor 120. In some cases, aspects of one or more stages may be omitted. For example, in some implementations, the monitoring server 160 may receive and/or analyze sensor data 125 that includes only usage information rather than both sensor status information and usage data.

Figure 2:
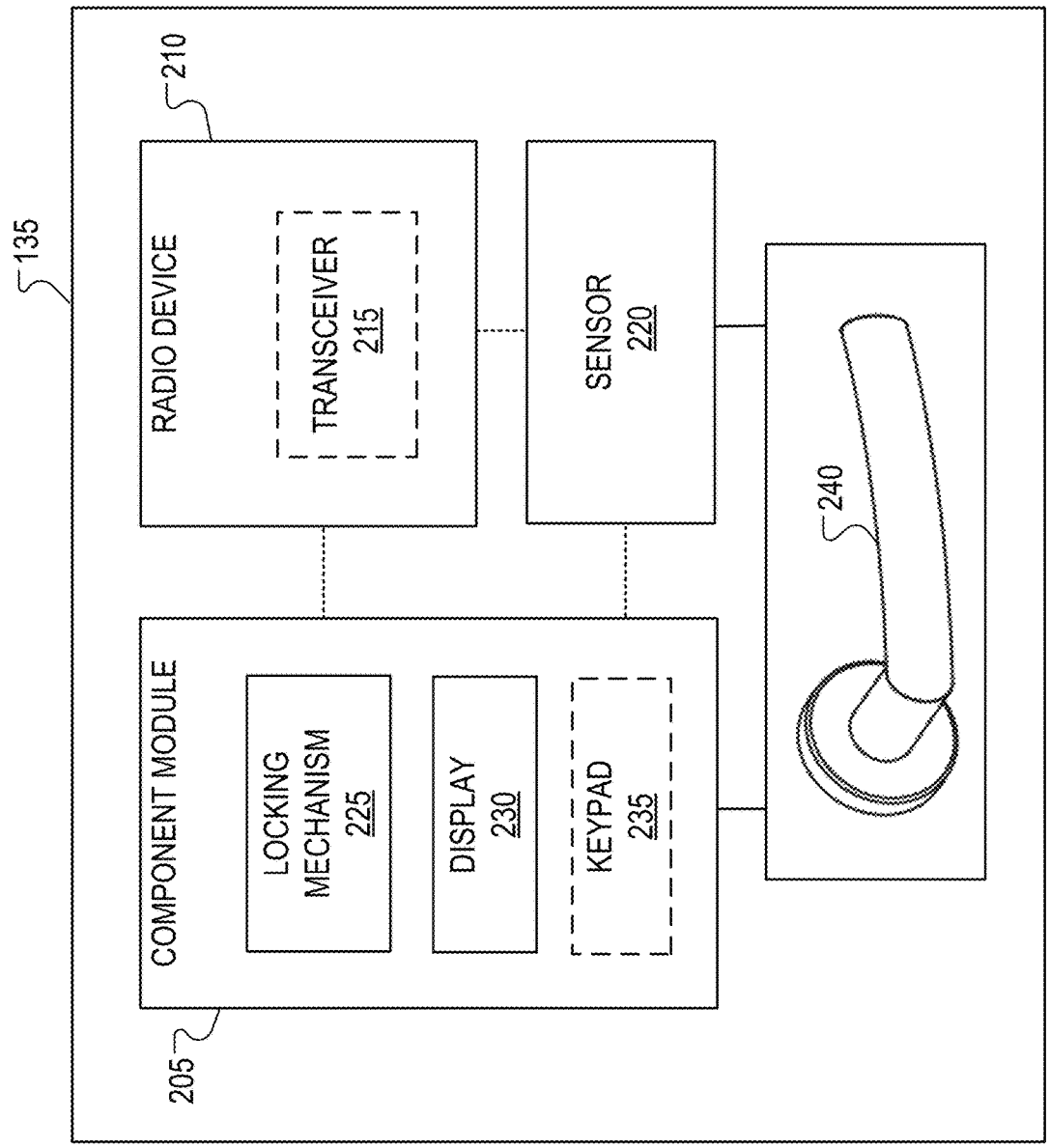
FIG. 2 illustrates an example smartlock device that can be installed at a property.

FIG. 2 illustrates an example smartlock device that can be installed at a property 102. As noted above, the system 100 can include one or more smartlock devices 135. Each of the smartlock devices 135 may be integrated in a door at property 102 or another item at the property 102 that can be used to control access to different sections or areas of the property 102. In some cases, the smartlock device 135 is a "smart" fire safety lock that is installed in an apartment home or commercial building to aid in routing or directing people (e.g., building occupants) to safety during a fire or other emergency incident. As noted above, the smartlock device 135 is operable to provide access to particular routes and areas of a property by automatically locking or unlocking a door at the property to permit an occupant to enter, exit, or pass through a room or area of the property.

In some implementations, the smartlock device 135 is operable to determine a routing of occupants at the property (i) based on sensor data 125 generated locally at the smartlock device 135, (ii) based on sensor data 125 that is generated by other sensors 120 at the property 102, or both. In some implementations, the smartlock device 135 is operable to transmit "panic" signals to remote monitoring stations (e.g., monitoring server 160) to indicate that a fire or other incident is occurring at the property 102. In some cases, the smartlock device 135 is operable to provide resources and information that can assist emergency responders in locating occupants at the property during an emergency incident.

The smartlock device 135 includes a locking mechanism 225 and a radio communication device 210 ("radio device 210"). In some implementations, radio device 210 is an example sensing device that includes a transceiver for i) transmitting sensor data generated using a sensing element or sensor of the sensing device or ii) receiving commands for controlling various functions of the radio/sensing device 210. In general, the smartlock device 135 and the locking mechanism 225 can include one or more features that relate to an example door lock, such as bolt (not shown) and a handle 240.

In some implementations, the locking mechanism 225 includes an example electronic actuator or solenoid lock for engaging the locking mechanism 225 to preclude opening (lock) a door or for disengaging the locking mechanism 225 to enable opening (unlock) the door. For example, the actuator or solenoid can be used to actuate the locking mechanism 225 in response to receiving an electrical signal, e.g., from the radio device 210, the control unit 110, or another component of the property monitoring system.

The smartlock device 135 can be configured for mobile or remote locking and unlocking. For example, the smartlock device 135 can include one or more electrical and/or mechanical mechanisms that can be triggered automatically, or manually, through application program installed on the client device 140 that communicates with the property monitoring system 100.

The radio device 210 can be a wireless radio, such a as category-M (Cat-M) device that includes an LTE chipset for exchanging data and signal communications with components of the property monitoring system. The radio device 210 generally includes a transceiver 215 and a sensor 220. The transceiver 215 is operable to transmit parameter signals generated by the sensor 220 and to receive commands for controlling safety features and locking functions of the smartlock device 135. For example, the commands can be processed by the radio device 210 to control an example actuator of the locking mechanism 225 to actuate the locking mechanism.

The sensor 220 can correspond to one or more of the sensors 120 described above. Similarly, the parameter signals generated by sensor 220 can represent sensor data corresponding to the sensor data 125, described above. In some implementations, the sensor 220 is a temperature sensor that is operable to detect elevated temperatures that are indicative of a fire at the property 102. In other implementations, the sensor 220 is an air quality or smoke detection sensor that is operable to detect smoke or poor air quality that may be indicative of a fire or other related emergency at the property 102.

The sensor 220 is operable to generate parameter signals representing sensor data 125. The parameter signals can be processed to determine whether the sensed parameter values exceed one or more predefined thresholds so as to indicate a particular type of emergency incident at the property 102 (e.g., a fire or elevated levels of carbon monoxide). For example, the sensor 220 responds by generating parameter signals representing sensor data that indicate particular types of detected temperatures that may be near or adjacent the smartlock device 135. The sensor 220 can be disposed, placed, or otherwise located at an interior or exterior section of an example smartlock device 135.

In addition to radio communications device 210, the smartlock device 135 can also include other radio frequency devices that have signal processing capabilities relating to WiFi, GPS, or LTE so that the smartlock device 135 can communicate sensor data about the safety of occupants 130 to a variety of communication devices.

In some implementations, the sensor 220 is operable to collect location and usage data about the occupants 130, such as a detected number of occupants 130 that are in a room at the property 102 or that are attempting to exit the property 102 during an emergency. For example, the sensor 220 can use one or more sensing elements associated with temperature readings or motion detection to generate parameter signals and values indicating distinct types of detected motion/movement of the occupants 130. In some implementations, the parameter values can indicate particular types of movement that are consistent with a large crowd of occupants 130. In other implementations, the sensor 220 is operable to detect a signature set of parameter (temperature) values for determining when a fire occurs at the property 102.

The smartlock device 135, including sensor 220, integrates with an existing security system installed at property 102. The smartlock device 135 can use the sensor 220 to detect the occurrence of an emergency event and communicate details associated with the event to the security system or a related property monitoring system when the event occurs.

The sensor 220 can interact with the transceiver 215 of the radio device 210 to communicate, e.g., in real-time, with components of the property monitoring system, including a client device 140 assigned to a registered owner of the property 102. In some implementations, the sensor 220 is a biometric scanning device, such as a fingerprint scanner/reader, that interacts with the transceiver 215 of the radio device 210 to obtain, transmit, or process signal data representing biometric attributes of a user. For example, the sensor 220, e.g., a biometric scanning device, can be configured to: i) obtain data representing a biometric attribute (e.g., a fingerprint or iris/retina attribute) of the property owner and ii) generate an authorization command based on analysis of the data representing the biometric attribute.

The authorization command is operable to engage (or disengage) the locking mechanism 225. The biometric scanning device represented by sensor 220 can be further configured to: i) engage the locking mechanism 225 when the smartlock device 135 is installed in a door at the property 102 based on a first authorization command; and ii) disengage the locking mechanism 225 based on a second authorization command that is different than the first authorization command.

In some implementations, the locking mechanism 225 is configured to be manually disengaged independent of receiving an authorization command for disengaging the locking mechanism. For example, the property owner or registered user of the smartlock device 135 can manually disengage the locking mechanism 225 by using a key, a fingerprint reader, a combination lock, a simple latch, or other methods related to these options for disengaging the locking mechanism 225. The keypad 235 is operable to actuate the locking mechanism 225 via one or more commands input by the user 108 or the monitoring server 160 of the property monitoring system 100.

In some implementations, the command 170 received by the smartlock device 135 from the monitoring server 160 is a data payload that includes instructions and data values for commanding each of the locking mechanism 225 and display 230 to perform one or more functions. For example, the instructions may be processed by the command module 205 to cause the smartlock device 135 to generate control signals for actuating the locking mechanism 225. Specifically, the locking mechanism 225 may actuate to extend a bolt to lock a door, retract a bolt to unlock a door to permit an occupant to open the door, retract a bolt to unlock and automatically open a door to permit an occupant to pass through a doorway, or some combination of these functions, based on the command 170.

The instructions may also be processed by the command module 205 to cause the smartlock device 135 to generate control signals for outputting the status indications on the display 230. In some implementations, the display 230 includes an LED and at least one status indication is an LED based notification. In this implementation, the display 230 is operable to display a red LED if the sensor 220 determines that temperature readings measured by the sensor 220 exceed a threshold temperature. For example, if the handle 240 on the smartlock device 135 is warm/hot, the LED of the display 230 is operable to display a red light, notifying occupants that it is not safe to touch the handle 240.

In some implementations, the smartlock device 135 is configured to automatically unlock, if the handle 240 becomes too hot or is experiencing a lot of heat. For example, smartlock device 135 can have an internal thermometer or thermal couple corresponding to sensor 220 that is operable to periodically measure temperature of the handle 240. If the temperature of the handle 240 exceeds a threshold temperature (e.g., a temperature that causes burns to human skin), the display 230 will trigger the red LED light. If the sensor 220 determines that a temperature of the handle 240 has exceeded the threshold temperature, the smartlock device 135 is operable to communicate with a control panel (e.g., control unit 110) to determine if a fire detector signal has been triggered by one or more other sensors 120 at the property 102.

In some implementations, the smartlock device 135 is operable to display a green LED light to notify residents of the safest exit route. For example, each of the smartlock device 135 or monitoring server 160 can compute an example safe route 155a base at least on the measured temperature of one or more smartlock devices 135 installed at the property 102. In this manner, the system 100 can generate commands to cause green LED indicators of one or more smartlock devices 135 to illuminate a safety route for residents based on the measured temperatures of the smartlock devices 135.

The locking mechanism 225 can be coupled to radio device 210, sensor 220, or both. Based on this coupling, the a bolt of the locking mechanism 225 can be extended to lock a door or retracted to unlock a door at the property 102 when the radio device 210 and/or sensor 220 senses or determines that a certain temperature reading indicates a fire is occurring within a particular proximity of the smartlock device 135.

In some implementations, the smartlock device 135 is configured such that the locking mechanism 225 automatically locks or unlocks a door when the smartlock device 135 detects a temperature value that exceeds a threshold temperature value of the smartlock device 135 or an area around the smartlock device 135. For example, the smartlock device 135 includes the radio communication device 210 and the transceiver 215 for detecting and processing location signals, air quality signals, temperature readings, detected motion, or other similar signals transmitted by other sensors or devices at the property 102.

The radio device 210 can process the signals to determine that an emergency incident such as a fire is occurring within a threshold proximity of the smartlock device 135, e.g., within 10 feet of the smartlock device 135. The smartlock device 135 can also include a simple unlock mode that allows a user/occupant to disengage the locking mechanism 225 in response to a single button press. The single button press can be used to override an autolock feature of the smartlock device 135 to allow access to other route options that can be used by occupants 130 to exit the property 102 during an emergency.

As discussed above, the monitoring server 160 can include an incident safety/routing engine. The safety/routing engine 170 is configured to processor sensor data 125 generated by at least one sensor 120, 220 located at the property 102. The sensor 120, 220 may be integrated in a radio communication device 210 that forms a portion of the smartlock device 135 that is integrated in a door or other item at the property.

Figure 3:
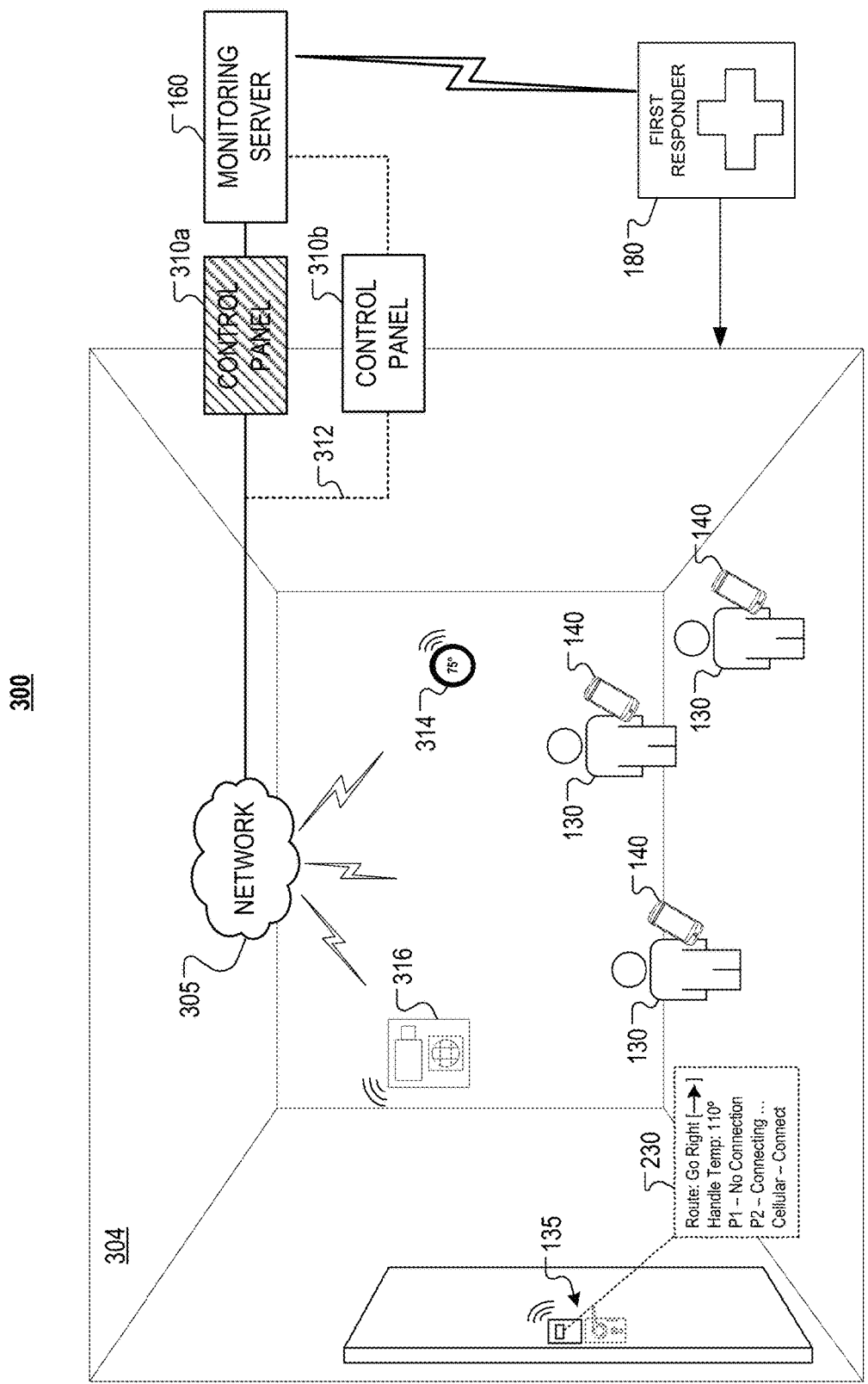
FIG. 3 shows an example area of a property with a door that includes the example smartlock device of FIG. 2.

FIG. 3 shows an example area 304 of a property 102 with a door that includes an example smartlock device. As noted above, the smartlock device 135 is operable to provide access to particular routes and areas of a property by automatically locking or unlocking a door at the property to permit an occupant to enter, exit, or pass through a room or area of the property. The implementation of FIG. 3 shows the smartlock device 135 installed in an example door at the property 102 that may be unlocked and opened to permit occupants 130 to exit the room in response to an emergency incident.

In some implementations, FIG. 3 represents an example layout/floorplan 300 (e.g., of a room) and position of a smartlock device 135 located in a room at the property 102. In some cases, control panels 310a/b are operable to display the layout 300 of an example building or rooms at the property 102. The doors that are included in the layout 300 may be highlighted to notify occupants 130 of the safest route during a fire. So, not only will the occupants 130 be able to see the green LED lights of the smartlock device 135 illuminating the safest route, but the occupants 130 can also see the route on one or more of control panels 310a/b, adding another layer of visual aids for the occupants.

In some implementations, devices such as a camera 316, a thermostat 314, client device 140, or the smartlock device 135 that were connected to a burned control panel 310a can attempt to connect to an example neighboring control panel 310b via the data connection 312. For example, the devices can attempt to communicate with another control panel 310b or other Z-Wave mesh networks if a fire is detected at the property 102. In some implementations, the control panel 310b can include a setting that enables the control panel to accept 'stray' devices in case of an emergency. Hence the devices may attempt to establish a data connection with the neighboring control panel 310b such that the devices may be able to obtain information about a fire or emergency incident and relay that information to emergency responders 180.

FIG. 4 shows an example process 400 for routing occupants at a property based on status indications presented on a display of an example smartlock device. In particular, process 400 corresponds to an example workflow for determining a routing of occupants at the property 102 and using a display 230 of a smartlock device 135 to present status indications to the occupants based on the determined routing. The status indications route or direct occupants at the property 102 toward an exit along a route that avoids the location of an incident, such as a fire or other related emergency event, at the property.

In general, process 400 can be implemented or performed using the systems described in this document. Descriptions of process 400 may reference one or more of the above-mentioned computing resources of system 100. In some implementations, steps of process 400 are enabled by programmed instructions that are executable by processing devices of the systems described in this document.

Referring now to process 400, sensor data about activity at a property is received from a sensor at a property (410). For example, the monitoring server 160 of the property monitoring system 100 is operable to receive sensor data 125 from one or more of the sensors 120 that are located at the property 102. A portion of the sensor data 125 that is received by the monitoring server 160 is generated by an example smartlock device integrated in a door at the property 102. Specifically, a portion of the sensor data 125 may be generated at least by sensor the 220 of the smartlock device 135.

The system 100 determines that temperatures measured or recorded by the sensor 220 are indicative of a fire or other related safety incident at the property (420). For example, based on the sensor data 125, the monitoring server 160 determines (i) that a first temperature of the smartlock device 135 is indicative of a fire at the property or (ii) that a second temperature of a room that is accessible using the door is indicative of a fire at the property, or both (i) and (ii).

In some implementations, the monitoring server 160 makes this determination by analyzing parameters of the sensor data 125 that includes temperature readings measured by a respective sensor 220 of two or more smartlock devices 135. In some implementations, the monitoring server 160 determines that temperatures are indicative of a fire at the property by cross-analyzing temperature readings measured by sensors 220 with parameter values of sensor data 125 that pertain to other activity at the property, such as motion detected by motion sensors 120 installed at the property 102 or smoke detected by smoke detectors/sensors 120 installed at the property 102.

The system 100 determines a routing of occupants at the property based on the sensor data 125 obtained from the sensors 120 or other devices installed at the property (430). For example, the monitoring server 160 is operable to determine a routing of occupants at the property based at least on the first temperature or the second temperature of the sensor data, and information in the sensor data 125 that indicates a location of the fire at the property.

The system 100 generates a status indication that includes the determined routing for output on a display of the smartlock device (440). For example, the monitoring server 160 is operable to generate, based on the sensor data 125, one or more status indications that are to be output on the display 230 of the smartlock device 135. The status indication includes the determined routing of the occupants. For example, the status indication can include a direction of one or more paths of the determined routing of the occupants. The direction of the one or more paths directs the occupants to a particular exit of the property along a route that avoids the fire or other safety incidents at the property.

The system 100 is operable to provide a command along with the status indication to the smartlock device to cause the smartlock device to either lock or unlock a door at the property and to direct an occupant to one or more paths of the determined routing (450). For example, the monitoring server 160 is operable to provide a command 170 that includes the status indication to the smartlock device 135 for processing by the command module 205 of the smartlock device 135.

The system 100 presents the status indication on the display of the smartlock device (460). For example, the monitoring server 160 is operable to present one or more status indications on the display 230 based on the command 170. Specifically, the monitoring server 160 presents the status indications based at least on a payload of the command 170 that includes data values of the instruction that specify the determined routing of the occupants. In this manner, the monitoring server 160 is operable to present, on the display 230 of the smartlock device 135, the status indication that includes the determined routing of the occupants based on the command 170.

Figure 5:
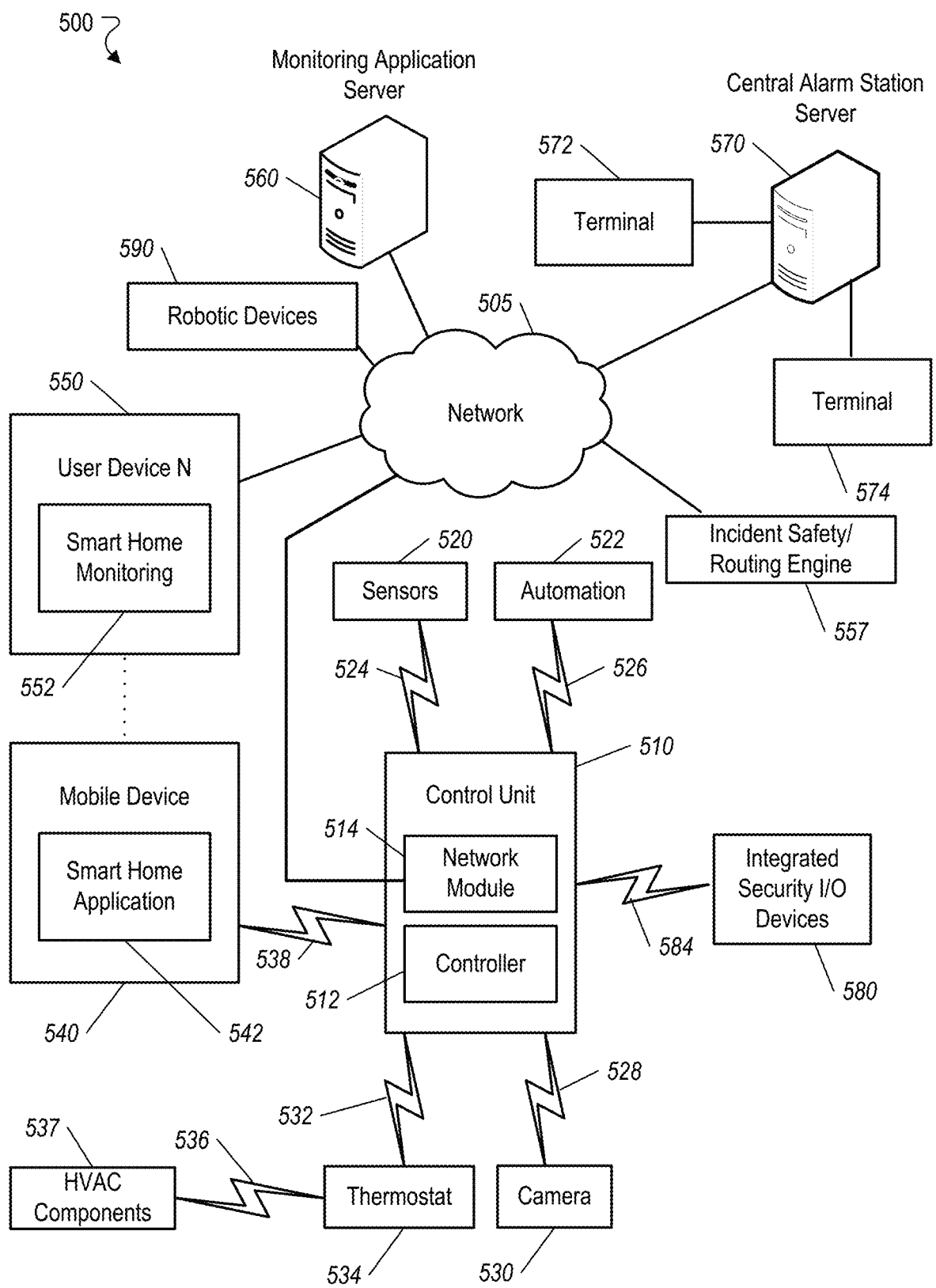
FIG. 5 shows a diagram illustrating an example property monitoring system.

FIG. 5 is a diagram illustrating an example of a property monitoring system 500. The electronic system 500 includes a network 505, a control unit 510, one or more user devices 540 and 550, a monitoring server 560, and a central alarm station server 570. In some examples, the network 505 facilitates communications between the control unit 510, the one or more user devices 540 and 550, the monitoring server 560, and the central alarm station server 570.

The network 505 is configured to enable exchange of electronic communications between devices connected to the network 505. For example, the network 505 may be configured to enable exchange of electronic communications between the control unit 510, the one or more user devices 540 and 550, the monitoring server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, x.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data.

The sensors 520 can also include a radio-frequency identification (RFID) sensor that identifies a particular article that includes a pre-assigned RFID tag.

The control unit 510 communicates with the home automation controls 522 and a camera 530 to perform monitoring. The home automation controls 522 are connected to one or more devices that enable automation of actions in the home. For instance, the home automation controls 522 may be connected to one or more lighting systems and may be configured to control operation of the one or more lighting systems. Also, the home automation controls 522 may be connected to one or more electronic locks at the home and may be configured to control operation of the one or more electronic locks (e.g., control Z-Wave locks using wireless communications in the Z-Wave protocol). Further, the home automation controls 522 may be connected to one or more appliances at the home and may be configured to control operation of the one or more appliances. The home automation controls 522 may include multiple modules that are each specific to the type of device being controlled in an automated manner. The home automation controls 522 may control the one or more devices based on commands received from the control unit 510. For instance, the home automation controls 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or home monitored by the control unit 510. The camera 530 may be configured to capture single, static images of the area and also video images of the area in which multiple images of the area are captured at a relatively high frequency (e.g., thirty images per second). The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the home automation controls 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring server 560 over the Internet. In these implementations, image data captured by the camera 530 does not pass through the control unit 510 and the camera 530 receives commands related to operation from the monitoring server 560.

The system 500 also includes thermostat 534 to perform dynamic environmental control at the home. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a home and/or environmental data at a home, e.g., at various locations indoors and outdoors at the home. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534. In some implementations, the thermostat 534 is controlled via one or more home automation controls 522.

A module 537 is connected to one or more components of an HVAC system associated with a home, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information 556 and the state of the HVAC system components to the thermostat 534 and can control the one or more components of the HVAC system based on commands received from the thermostat 534.

The system 500 includes one or more incident safety/routing engine 557. Each of the one or more safety/routing engines 557 connects to control unit 510, e.g., through network 505. The safety/routing engines 557 can be computing devices (e.g., a computer, microcontroller, FPGA, ASIC, or other device capable of electronic computation) capable of receiving data related to the sensors 520 and communicating electronically with the monitoring system control unit 510 and monitoring server 560.

The safety/routing engine 557 receives data from one or more sensors 520. In some examples, the safety/routing engine 557 can be used to determine or indicate whether a locking mechanism is engaged or disengaged based on data generated by sensors 520 (e.g., data from sensor 520 describing motion, movement, temperatures and other parameters). The safety/routing engine 557 can receive data from the one or more sensors 520 through any combination of wired and/or wireless data links. For example, the safety/routing engine 557 can receive sensor data via a Bluetooth, Bluetooth LE, Z-wave, or Zigbee data link.

The safety/routing engine 557 communicates electronically with the control unit 510. For example, the safety/routing engine 557 can send data related to the sensors 520 to the control unit 510 and receive commands related to determining a state of smartlock device 135 and locking mechanism 225 based on data from the sensors 520. In some examples, the safety/routing engine 557 processes or generates sensor signal data, for signals emitted by the sensors 520, prior to sending it to the control unit 510. The sensor signal data can include information that indicates a temperature sensor 220 of the smartlock device 135 detects elevated temperatures on at least a handle 240 of the smartlock device 135.

In some examples, the system 500 further includes one or more robotic devices 590. The robotic devices 590 may be any type of robots that are capable of moving and taking actions that assist in home monitoring. For example, the robotic devices 590 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and also roll along the ground, walls, or ceiling) and land vehicle type devices (e.g., automated cars that drive around a home). In some cases, the robotic devices 590 may be devices that are intended for other purposes and merely associated with the system 500 for use in appropriate circumstances. For instance, a robotic vacuum cleaner device may be associated with the monitoring system 500 as one of the robotic devices 590 and may be controlled to take action responsive to monitoring system events.

In some examples, the robotic devices 590 automatically navigate within a home. In these examples, the robotic devices 590 include sensors and control processors that guide movement of the robotic devices 590 within the home. For instance, the robotic devices 590 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 590 may include control processors that process output from the various sensors and control the robotic devices 590 to move along a path that reaches the desired destination and avoids obstacles. In this regard, the control processors detect walls or other obstacles in the home and guide movement of the robotic devices 590 in a manner that avoids the walls and other obstacles.

In addition, the robotic devices 590 may store data that describes attributes of the home. For instance, the robotic devices 590 may store a floorplan and/or a three-dimensional model of the home that enables the robotic devices 590 to navigate the home. During initial configuration, the robotic devices 590 may receive the data describing attributes of the home, determine a frame of reference to the data (e.g., a home or reference location in the home), and navigate the home based on the frame of reference and the data describing attributes of the home. Further, initial configuration of the robotic devices 590 also may include learning of one or more navigation patterns in which a user provides input to control the robotic devices 590 to perform a specific navigation action (e.g., fly to an upstairs bedroom and spin around while capturing video and then return to a home charging base). In this regard, the robotic devices 590 may learn and store the navigation patterns such that the robotic devices 590 may automatically repeat the specific navigation actions upon a later request.

In some examples, the robotic devices 590 may include data capture and recording devices. In these examples, the robotic devices 590 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 590 to take and store a biometric sample that can be used to identify the person (e.g., a biometric sample with DNA that can be used for DNA testing).

In some implementations, the robotic devices 590 may include output devices. In these implementations, the robotic devices 590 may include one or more displays, one or more speakers, and/or any type of output devices that allow the robotic devices 590 to communicate information to a nearby user.

The robotic devices 590 also may include a communication module that enables the robotic devices 590 to communicate with the control unit 510, each other, and/or other devices. The communication module may be a wireless communication module that allows the robotic devices 590 to communicate wirelessly. For instance, the communication module may be a Wi-Fi module that enables the robotic devices 590 to communicate over a local wireless network at the home. The communication module further may be a 900 MHz wireless communication module that enables the robotic devices 590 to communicate directly with the control unit 510. Other types of short-range wireless communication protocols, such as Bluetooth, Bluetooth LE, Z-wave, Zigbee, etc., may be used to allow the robotic devices 590 to communicate with other devices in the home. In some implementations, the robotic devices 590 may communicate with each other or with other devices of the system 500 through the network 505.

The robotic devices 590 further may include processor and storage capabilities. The robotic devices 590 may include any suitable processing devices that enable the robotic devices 590 to operate applications and perform the actions described throughout this disclosure. In addition, the robotic devices 590 may include solid state electronic storage that enables the robotic devices 590 to store applications, configuration data, collected sensor data, and/or any other type of information available to the robotic devices 590.

The robotic devices 590 are associated with one or more charging stations. The charging stations may be located at predefined home base or reference locations in the home. The robotic devices 590 may be configured to navigate to the charging stations after completion of tasks needed to be performed for the monitoring system 500. For instance, after completion of a monitoring operation or upon instruction by the control unit 510, the robotic devices 590 may be configured to automatically fly to and land on one of the charging stations. In this regard, the robotic devices 590 may automatically maintain a fully charged battery in a state in which the robotic devices 590 are ready for use by the monitoring system 500.

The charging stations may be contact based charging stations and/or wireless charging stations. For contact based charging stations, the robotic devices 590 may have readily accessible points of contact that the robotic devices 590 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 590 may charge through a wireless exchange of power. In these cases, the robotic devices 590 need only locate themselves closely enough to the wireless charging stations for the wireless exchange of power to occur. In this regard, the positioning needed to land at a predefined home base or reference location in the home may be less precise than with a contact based charging station. Based on the robotic devices 590 landing at a wireless charging station, the wireless charging station outputs a wireless signal that the robotic devices 590 receive and convert to a power signal that charges a battery maintained on the robotic devices 590.

In some implementations, each of the robotic devices 590 has a corresponding and assigned charging station such that the number of robotic devices 590 equals the number of charging stations. In these implementations, the robotic devices 590 always navigate to the specific charging station assigned to that robotic device. For instance, a first robotic device may always use a first charging station and a second robotic device may always use a second charging station.

In some examples, the robotic devices 590 may share charging stations. For instance, the robotic devices 590 may use one or more community charging stations that are capable of charging multiple robotic devices 590. The community charging station may be configured to charge multiple robotic devices 590 in parallel. The community charging station may be configured to charge multiple robotic devices 590 in serial such that the multiple robotic devices 590 take turns charging and, when fully charged, return to a predefined home base or reference location in the home that is not associated with a charger. The number of community charging stations may be less than the number of robotic devices 590.

Also, the charging stations may not be assigned to specific robotic devices 590 and may be capable of charging any of the robotic devices 590. In this regard, the robotic devices 590 may use any suitable, unoccupied charging station when not in use. For instance, when one of the robotic devices 590 has completed an operation or is in need of battery charge, the control unit 510 references a stored table of the occupancy status of each charging station and instructs the robotic device to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices 580. Additionally, the one or more control units 510 may receive one or more sensor data from the sensors 520 and determine whether to provide an alert to the one or more integrated security input/output devices 580.

The sensors 520, the home automation controls 522, the camera 530, the thermostat 534, and the integrated security devices 580 may communicate with the controller 512 over communication links 524, 526, 528, 532, 538, 536, and 584. The communication links 524, 526, 528, 532, 538, and 584 may be a wired or wireless data pathway configured to transmit signals from the sensors 520, the home automation controls 522, the camera 530, the thermostat 534, and the integrated security devices 580 to the controller 512. The sensors 520, the home automation controls 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 538, and 584 may include a local network. The sensors 520, the home automation controls 522, the camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 560 is an electronic device configured to provide monitoring services by exchanging electronic communications with the control unit 510, the one or more user devices 540 and 550, and the central alarm station server 570 over the network 505. For example, the monitoring server 560 may be configured to monitor events (e.g., alarm events) generated by the control unit 510. In this example, the monitoring server 560 may exchange electronic communications with the network module 514 included in the control unit 510 to receive information regarding events (e.g., alerts) detected by the control unit 510. The monitoring server 560 also may receive information regarding events (e.g., alerts) from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor and image data received from the monitoring system and perform analysis of sensor and image data received from the monitoring system. Based on the analysis, the monitoring server 560 may communicate with and control aspects of the control unit 510 or the one or more user devices 540 and 550.

The monitoring server 560 may provide various monitoring services to the system 500. For example, the monitoring server 560 may analyze the sensor, image, and other data to determine an activity pattern of a resident of the home monitored by the system 500. In some implementations, the monitoring server 560 may analyze the data for alarm conditions or may determine and perform actions at the home by issuing commands to one or more of the controls 522, possibly through the control unit 510.

The central alarm station server 570 is an electronic device configured to provide alarm monitoring service by exchanging communications with the control unit 510, the one or more mobile devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more mobile devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more authorized user devices 540 and 550 are devices that host and display user interfaces. For instance, the user device 540 is a mobile device that hosts or runs one or more native applications (e.g., the smart home application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a smart home application 542. The smart home application 542 refers to a software/firmware program running on the corresponding mobile device that enables the user interface and features described throughout. The user device 540 may load or install the smart home application 542 based on data received over a network or data received from local media. The smart home application 542 runs on mobile devices platforms, such as iPhone, iPod touch, Blackberry, Google Android, Windows Mobile, etc. The smart home application 542 enables the user device 540 to receive and process image and sensor data from the monitoring system.

The user device 550 may be a general-purpose computer (e.g., a desktop personal computer, a workstation, or a laptop computer) that is configured to communicate with the monitoring server 560 and/or the control unit 510 over the network 505. The user device 550 may be configured to display a smart home user interface 552 that is generated by the user device 550 or generated by the monitoring server 560. For example, the user device 550 may be configured to display a user interface (e.g., a web page) provided by the monitoring server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, Zigbee, HomePlug (ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540 and 550 through the network 505. In this regard, the monitoring server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 includes the one or more user devices 540 and 550, the sensors 520, the home automation controls 522, the camera 530, the robotic devices 590, and the safety/routing engine 557. The one or more user devices 540 and 550 receive data directly from the sensors 520, the home automation controls 522, the camera 530, the robotic devices 590, and the safety/routing engine 557 and sends data directly to the sensors 520, the home automation controls 522, the camera 530, the robotic devices 590, and the safety/routing engine 557. The one or more user devices 540, 550 provide the appropriate interfaces/processing to provide visual surveillance and reporting.

In other implementations, the system 500 further includes network 505 and the sensors 520, the home automation controls 522, the camera 530, the thermostat 534, the robotic devices 590, and the safety/routing engine 557 are configured to communicate sensor and image data to the one or more user devices 540 and 550 over network 505 (e.g., the Internet, cellular network, etc.). In yet another implementation, the sensors 520, the home automation controls 522, the camera 530, the thermostat 534, the robotic devices 590, and the safety/routing engine 557 (or a component, such as a bridge/router) are intelligent enough to change the communication pathway from a direct local pathway when the one or more user devices 540 and 550 are in close physical proximity to the sensors 520, the home automation controls 522, the camera 530, the thermostat 534, the robotic devices 590, and the safety/routing engine 557 to a pathway over network 505 when the one or more user devices 540 and 550 are farther from the sensors 520, the home automation controls 522, the camera 530, the thermostat 534, the robotic devices 590, and the safety engine.

In some examples, the system leverages GPS information from the one or more user devices 540 and 550 to determine whether the one or more user devices 540 and 550 are close enough to the sensors 520, the home automation controls 522, the camera 530, the thermostat 534, the robotic devices 590, and the safety/routing engine 557 to use the direct local pathway or whether the one or more user devices 540 and 550 are far enough from the sensors 520, the home automation controls 522, the camera 530, the thermostat 534, the robotic devices 590, and the safety/routing engine 557 that the pathway over network 505 is required.

In other examples, the system leverages status communications (e.g., pinging) between the one or more user devices 540 and 550 and the sensors 520, the home automation controls 522, the camera 530, the thermostat 534, the robotic devices 590, and the safety/routing engine 557 to determine whether communication using the direct local pathway is possible. If communication using the direct local pathway is possible, the one or more user devices 540 and 550 communicate with the sensors 520, the home automation controls 522, the camera 530, the thermostat 534, the robotic devices 590, and the safety/routing engine 557 using the direct local pathway. If communication using the direct local pathway is not possible, the one or more user devices 540 and 550 communicate with the sensors 520, the home automation controls 522, the camera 530, the thermostat 534, the robotic devices 590, and the safety/routing engine 557 using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 530). In these implementations, the camera 530 may be set to capture images on a periodic basis when the alarm system is armed in an "away" state, but set not to capture images when the alarm system is armed in a "home" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory.

Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A smartlock device for integrating in a door at a property, the smartlock device comprising:
 a locking mechanism within the smartlock device configured to lock the door and to unlock the door;
 a sensor within the smartlock device that is operable to determine a first temperature of the smartlock device or a second temperature of a room that is accessible via the door that integrates the smartlock device;
 a radio device within the smartlock device that is operable to:
  i) receive parameter signals from the sensor indicating each of the first and second temperatures;
  ii) transmit, to a monitoring system of the property, data that includes each of the first and second temperatures; and
  iii) receive a command to cause the locking mechanism to unlock the door based on information from the monitoring system, wherein the information includes a determined routing of occupants at the property; and
 an electronic display within the smartlock device operable to present:
  a status indication that includes the determined routing of the occupants at the property, and a direction i) one or more paths of the determined routing of the occupants ii) that is represented by the status indication, and iii) directs the occupants to a particular exit of the property along a route that avoids the fire at the property.

2. The smartlock device of claim 1, wherein the electronic display is operable to output status indications about each of (a) the smartlock device and (b) the property, based on the sensor, the radio device, and the information from the monitoring system.

3. The smartlock device of claim 2, wherein one or more of the status indications comprises:
  i) a first status indication that is based at least on the sensor and that indicates the first temperature of the smartlock device or the second temperature of the room that is accessible via the door; and
  ii) a second status indication that is based at least on the radio device and the information, and that indicates a determined routing of occupants at the property.

4. A computer-implemented method performed using a smartlock device integrated in a door at a property, the method comprising:
  receiving, from a sensor within the smartlock device at the property, sensor data about activity at a property, wherein a portion of the sensor data is generated by the smartlock device;
  determining, based on the sensor data, that at least one of a first temperature of the smartlock device is indicative of a fire at the property or a second temperature of a room that is accessible via the door is indicative of a fire at the property;
  determining a routing of occupants at the property based at least on the first temperature or the second temperature of the sensor data and information in the sensor data that indicates a location of the fire at the property;
  generating, based on the sensor data, a status indication to be output on an electronic display within the smartlock device, wherein the status indication includes the determined routing of the occupants;
  providing, to the smartlock device, a command that includes the status indication;
  causing, by the smartlock device and based on the command, a locking mechanism of the smartlock to unlock the door to permit an occupant at the property to open the door; and
  presenting, on the electronic display of the smartlock device, the status indication that includes the determined routing of the occupants based on the command, and
  a direction of one or more paths of the determined routing of the occupants ii) that is represented by the status indication, and iii)
  directs the occupants to a particular exit of the property along a route that avoids the fire at the property.

5. The method of claim 4, wherein the property includes a plurality of doors and each door of the plurality of doors includes a respective smartlock device integrated in the door, and the method comprises:
  providing, to each smartlock device, the command that includes the status indication; and
  presenting, on a respective electronic display of each smartlock device, a portion of the determined routing of the occupants based on the command.

6. The method of claim 5, comprising:
  generating a safety alert from information used to generate the command; and
  providing the safety alert to a first responder or a property manager of the property;
  wherein the safety alert describes the determined routing of the occupants and a particular exit of the property that is included in the determined routing.

7. The method of claim 6, wherein the particular exit is specified in the status indication presented on the electronic display of one or more of a plurality of smartlock devices.

8. A computer-implemented method performed using a smartlock device integrated in a door at a property, the method comprising:
  receiving, from a sensor at the property, sensor data about activity at a property, wherein a portion of the sensor data is generated by the smartlock device;
  determining, based on the sensor data, that at least one of a first temperature of the smartlock device is indicative of a fire at the property or a second temperature of a room that is accessible via the door is indicative of a fire at the property;
  determining a routing of occupants at the property based at least on the first temperature or the second temperature of the sensor data and information in the sensor data that indicates a location of the fire at the property;
  generating, based on the sensor data, a status indication to be output on an electronic display of the smartlock device, wherein the status indication i) includes the determined routing of the occupants and ii) represents a direction of one or more paths of the determined routing of the occupants;
  providing, to the smartlock device, a command that includes the status indication;
  causing, by the smartlock device and based on the command, a locking mechanism of the smartlock to unlock the door to permit an occupant at the property to open the door; and
  presenting, on the display of the smartlock device, the status indication that includes the determined routing of the occupants based on the command:
    the status indication, and
    the direction of the one or more paths directs the occupants to a particular exit of the property along a route that avoids the fire at the property, the property includes
      a plurality of doors and each door of the plurality of doors includes a respective smartlock device integrated in the door, the method further comprising:
  providing, to each smartlock device, the command that includes the status indication; and
  presenting, on a respective electronic display of each smartlock device, a portion of the determined routing of the occupants based on the command;
  generating a safety alert from information used to generate the command;
  providing the safety alert to a first responder or a property manager of the property;
  the safety alert describes the determined routing of the occupants and a particular exit of the property that is included in the determined routing
  providing the safety alert to the first responder to guide the first responder to the particular exit and to enable the first responder to receive the occupants as the occupants exit the property using the particular exit.

9. The method of claim 8, wherein the route avoids areas of the property that:
  (i) have the first temperature which is indicative of the fire, and (ii) have the second temperature and include the room that is accessible via the door.

10. The method of claim 9, comprising:
generating a particular safety alert that specifies the direction of the one or more paths of the determined routing of the occupants; and
presenting the particular safety alert on each respective electronic display of a plurality of smartlock devices.

11. The method of claim 10, comprising:
providing the particular safety alert to a particular first responder to enable the particular first responder to locate the occupants along one or more paths that direct the occupants to the particular exit of the property.

12. A system comprising a smartlock device integrated in a door at a property, a processing device, and one or more computer-readable storage mediums storing instructions that are executable by the processing device to cause performance of operations comprising:
receiving, from a sensor within the smartlock device at the property, sensor data about activity at a property, wherein a portion of the sensor data is generated by the smartlock device;
determining, based on the sensor data, that at least one of a first temperature of the smartlock device is indicative of a fire at the property or a second temperature of a room that is accessible via the door is indicative of a fire at the property;
determining a routing of occupants at the property based at least on the first temperature or the second temperature of the sensor data and information in the sensor data that indicates a location of the fire at the property;
generating, based on the sensor data, a status indication to be output on an electronic display within the smartlock device, wherein the status indication includes the determined routing of the occupants;
providing, to the smartlock device, a command that includes the status indication;
causing, by the smartlock device and based on the command, a locking mechanism within the smartlock to unlock the door to permit an occupant at the property to open the door; and
presenting, on the electronic display of the smartlock device, the status indication that includes the determined routing of the occupants based on the command,
wherein the status indication represents a direction of one or more paths of the determined routing of the occupants; and
the direction of the one or more paths directs the occupants to a particular exit of the property along a route that avoids the fire at the property.

13. The system of claim 12, wherein the property includes a plurality of doors and each door of the plurality of doors includes a respective smartlock device integrated in the door, and the operations comprise:
providing, to each smartlock device, the command that includes the status indication; and
presenting, on a respective electronic display of each smartlock device, a portion of the determined routing of the occupants based on the command.

14. The system of claim 13, wherein the operations comprise:
generating a safety alert from information used to generate the command; and
providing the safety alert to a first responder or a property manager of the property;
wherein the safety alert describes the determined routing of the occupants and a particular exit of the property that is included in the determined routing.

15. The system of 12, wherein the route avoids areas of the property that:
(i) have the first temperature which is indicative of the fire, and
(ii) have the second temperature and include the room that is accessible via the door.

16. The system of claim 15, wherein the operations comprise:
generating a particular safety alert that specifies the direction of the one or more paths of the determined routing of the occupants;
presenting the particular safety alert on each respective electronic display of a plurality of smartlock devices; and
providing the particular safety alert to a particular first responder to enable the particular first responder to locate the occupants along one or more paths that direct the occupants to the particular exit of the property.

17. A system comprising a smartlock device integrated in a door at a property, a processing device, and one or more computer-readable storage mediums storing instructions that are executable by the processing device to cause performance of operations comprising:
receiving, from a sensor at the property, sensor data about activity at a property, wherein a portion of the sensor data is generated by the smartlock device;
determining, based on the sensor data, that at least one of a first temperature of the smartlock device is indicative of a fire at the property or a second temperature of a room that is accessible via the door is indicative of a fire at the property;
determining a routing of occupants at the property based at least on the first temperature or the second temperature of the sensor data and information in the sensor data that indicates a location of the fire at the property;
generating, based on the sensor data, a status indication to be output on a display of the smartlock device, wherein the status indication includes the determined routing of the occupants;
providing, to the smartlock device, a command that includes the status indication;
causing, by the smartlock device and based on the command, a locking mechanism of the smartlock to unlock the door to permit an occupant at the property to open the door; and
presenting, on the display of the smartlock device, the status indication that includes the determined routing of the occupants based on the command:
the status indication represents a direction of one or more paths of the determined routing of the occupants, and
the direction of the one or more paths directs the occupants to a particular exit of the property along a route that avoids the fire at the property, the property includes
a plurality of doors and each door of the plurality of doors includes a respective smartlock device integrated in the door; the operations further comprising:
providing, to each smartlock device, the command that includes the status indication;
presenting, on a respective display of each smartlock device, a portion of the determined routing of the occupants based on the command;

generating a safety alert from information used to generate the command;

providing the safety alert to a first responder or a property manager of the property, wherein the safety alert describes the determined routing of the occupants and a particular exit of the property that is included in the determined routing; and providing the safety alert to the first responder to guide the first responder to the particular exit and to enable the first responder to receive the occupants as the occupants exit the property using the particular exit.

18. The system of claim 17, wherein the particular exit is specified in the status indication presented on the display of one or more of a plurality of smartlock devices.

* * * * *

UNITED STATES PATENT AND TRADEMARK OFFICE
CERTIFICATE OF CORRECTION

PATENT NO. : 11,514,764 B2
APPLICATION NO. : 17/101728
DATED : November 29, 2022
INVENTOR(S) : Matthew Daniel Correnti et al.

Page 1 of 1

It is certified that error appears in the above-identified patent and that said Letters Patent is hereby corrected as shown below:

In the Claims

In Claim 1, Column 27, Line 1, after "i)" insert -- of --.

In Claim 15, Column 30, Line 4, delete "12," and insert -- claim 12, --.

Signed and Sealed this
Twenty-fourth Day of January, 2023

Katherine Kelly Vidal
*Director of the United States Patent and Trademark Office*